Aug. 18, 1959   G. G. MEEK   2,899,925
TOWING APPARATUS FOR WATER SKIERS
Filed Dec. 4, 1957   5 Sheets-Sheet 1
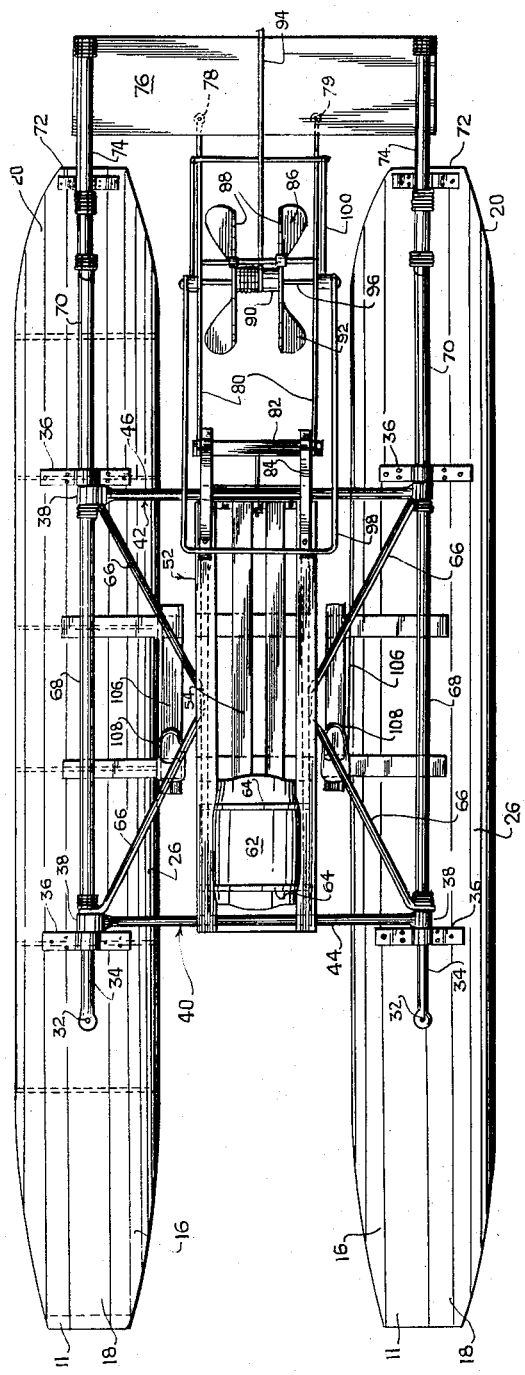
INVENTOR.
GREGORY G. MEEK
BY
ATTORNEY Aug. 18, 1959 G. G. MEEK 2,899,925
TOWING APPARATUS FOR WATER SKIERS
Filed Dec. 4, 1957 5 Sheets-Sheet 2

INVENTOR.
GREGORY G. MEEK
BY
ATTORNEY

Aug. 18, 1959     G. G. MEEK     2,899,925
TOWING APPARATUS FOR WATER SKIERS
Filed Dec. 4, 1957     5 Sheets-Sheet 3
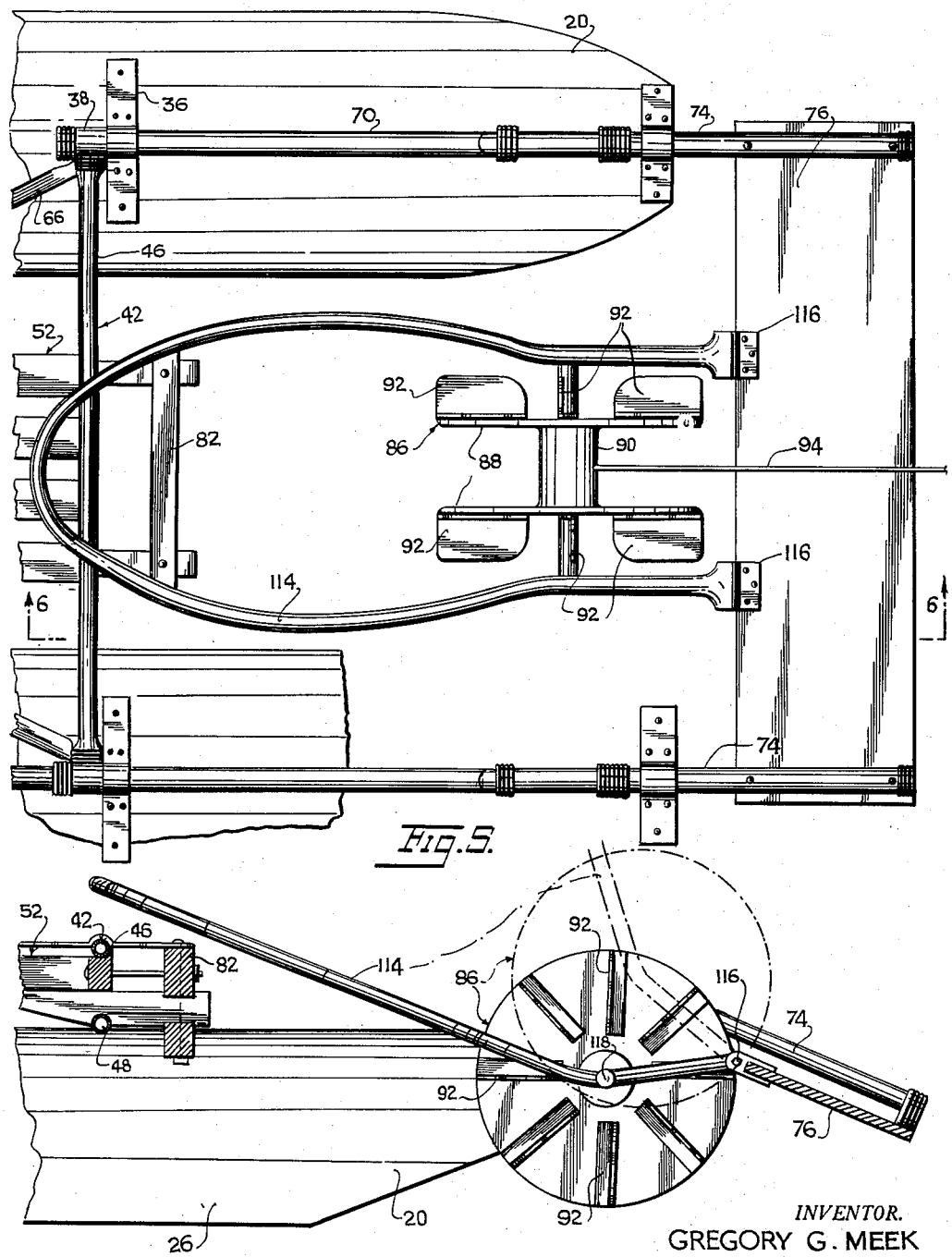
INVENTOR.
GREGORY G. MEEK
BY
ATTORNEY

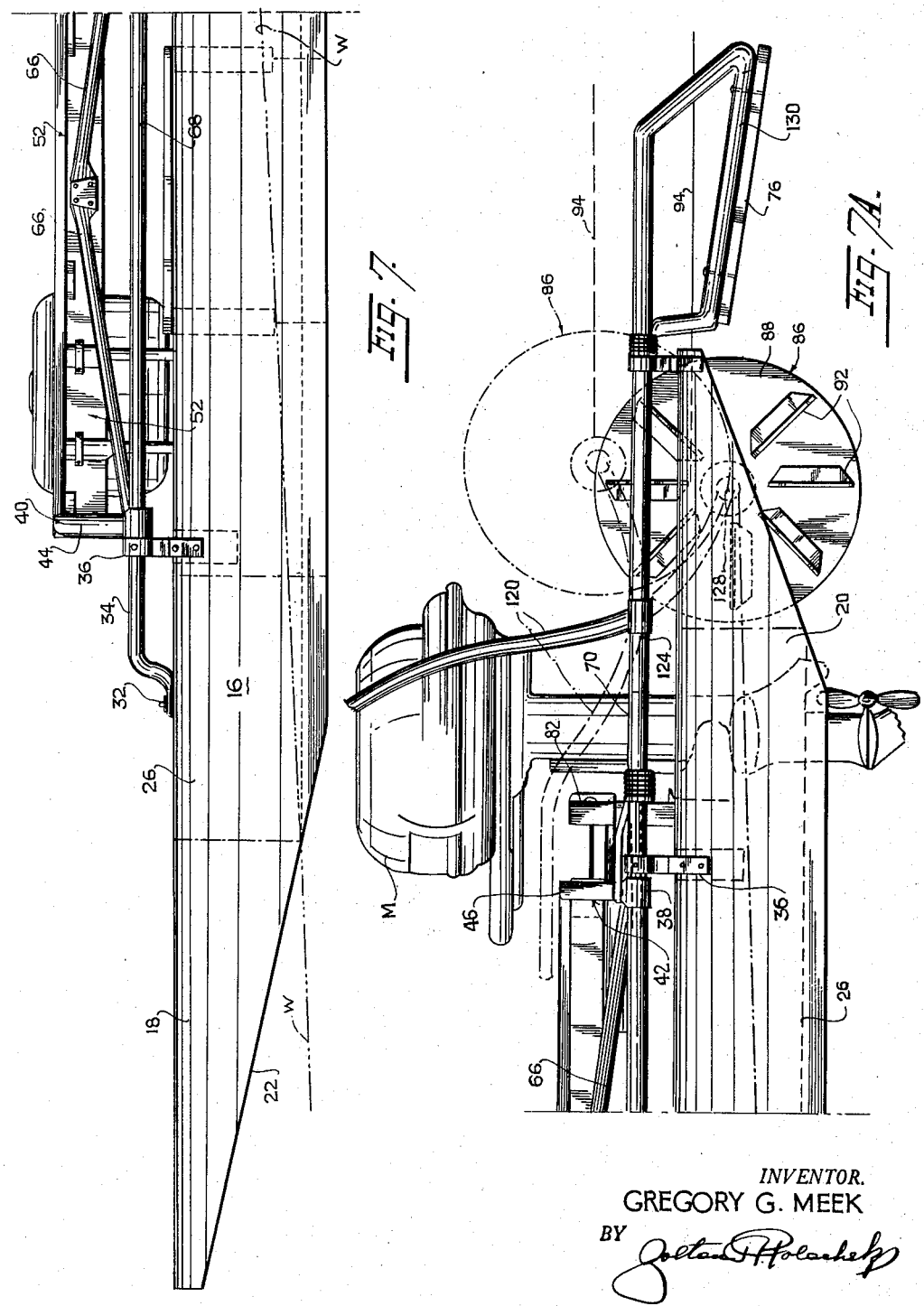

Aug. 18, 1959  G. G. MEEK  2,899,925
TOWING APPARATUS FOR WATER SKIERS
Filed Dec. 4, 1957  5 Sheets-Sheet 5

INVENTOR.
GREGORY G. MEEK
BY
ATTORNEY

United States Patent Office

2,899,925
Patented Aug. 18, 1959

2,899,925

TOWING APPARATUS FOR WATER SKIERS

Gregory G. Meek, Williston Park, N.Y.

Application December 4, 1957, Serial No. 700,599

11 Claims. (Cl. 114—235)

This invention relates to a self-propelled apparatus for water skiers, designed particularly for facilitating the launching and landing of the water skier, and further designed for high maneuverability, thereby to increase the skill and pleasure associated with the sport of water skiing.

Water skiing is becoming an increasingly popular aquatic sport. Normally, a water skier is equipped with a pair of skis formed very much like the skis used on ice or snow. The water skier is drawn, usually, by a speedboat, through the provision of a cable extending rearwardly from the boat, the water skier grasping a crossbar or handle provided upon the cable.

This arrangement has certain disadvantages. For example, launching of the water skier is somewhat difficult. This is due to the fact that unless the skier is moving in a forward direction, it is difficult if not impossible for him to be supported buoyantly in the water. Further, landing of the skier is difficult, by reason of the fact that when the boat slows down or stops, the skier must still be at a substantial distance rearwardly from the craft, with the result that the skier may quite possibly be unable to maintain his balance.

Still further, in maneuvering of a speedboat, turns cannot be made, in many instances, sufficiently sharply to impart the maximum pleasure and skill to the sport. Then again, a heavy wake is thrown up by a conventional speedboat, in which wake the skier must travel, unless he is drawn at a very great distance in back of the speedboat, which, of course, would not be desirable.

In view of the above, it is proposed in accordance with the invention to provide a towing apparatus or craft designed particularly for use in towing a water skier, which craft will be designed for launching of the skier directly from the craft, and also for landing of the skier on the craft.

A more specific object is to incorporate in the craft a reel or rotary drum, on which the towing cable is wound, with said drum being so designed as to be rotated by the water during the forward movement of the towing apparatus, for the purpose of pulling the skier onto a landing platform of the water craft whenever the skier is to land.

Another object is to incorporate, in association with said reel, means for elevation and lowering the reel so as to either immerse the same in the water or lift the same above the water, whereby to control the rotary movement of the reel.

Still another object is to associate with the reel a braking means which will be selectively movable against the reel, in a manner such that the reel can be normally held against rotation while the skier is being towed, with said reel being nevertheless designed to be disengaged from the braking means for the purpose of permitting rotation of the reel in a cable-unwinding direction, during launching of the skier and movement of the skier rearwardly from the craft to a selected distance from the towing apparatus or craft.

A further object is to provide in association with said reel a novelly designed launching and landing platform.

Still another object is to provide towing apparatus of the character described which will be of high stability in the water, through the provision of a catamaran type pontoon or float assembly.

Still another object is to provide apparatus of the character stated wherein the floats can be swung by foot pressure in a manner to steer the device in a selected direction.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a water ski towing apparatus of the catamaran type, formed according to the present invention.

Fig. 2 is a top plan view of the apparatus.

Fig. 5 is a fragmentary, enlarged, top plan view of a modified construction.

Fig. 6 is a longitudinal sectional view on the same scale as Fig. 5, taken substantially on line 6—6 of Fig. 5, the reel being shown in full and dotted lines, in lowered and raised positions respectively.

Figs. 7 and 7A are side elevational views of a modified construction showing the front and rear end portions of another modification.

Figure 3:
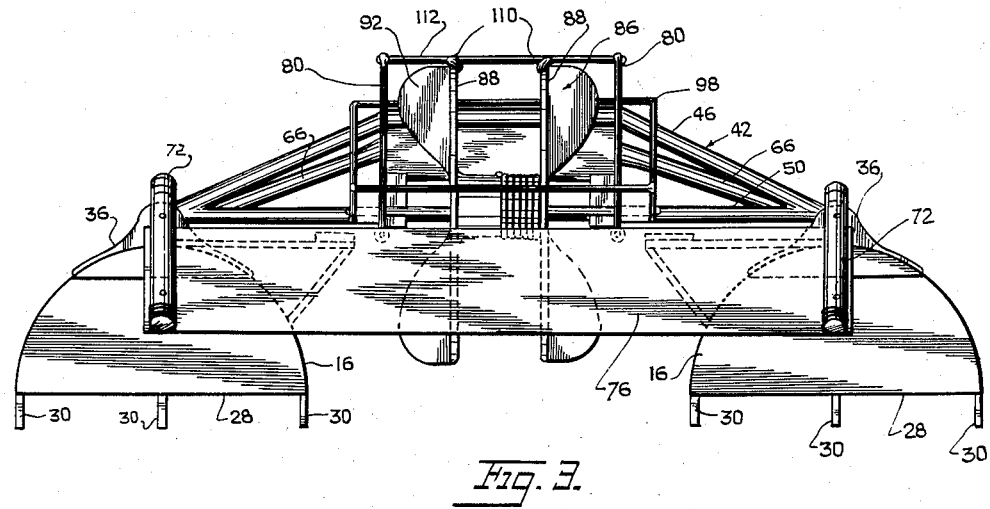
Fig. 3 is a rear elevational view thereof on an enlarged scale.
Figure 4:
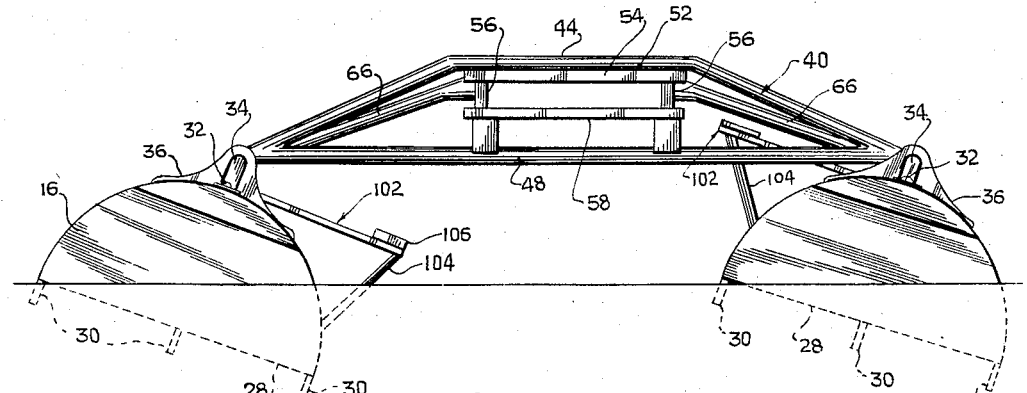
Fig. 4 is a front elevational view, on the same scale as Fig. 3, with the floats in position for a left turn.

In the form of the invention shown in Figs. 1–4 a pair of identical, parallel, transversely spaced floats or pontoons 16 have tapered forward and rear end portions 18, 20, respectively formed with flat, oppositely inclined bottom surfaces 22, 24, respectively. The flat undersides of the body portions 26 of the pontoons have been designated at 28, and secured to the bottom surfaces 28 in transversely spaced, longitudinally extending positions are keel-like ribs or stabilizers 30. The pontoons, as shown in Figs. 3 and 4, are of semicircular cross section in a preferred embodiment, with their transversely curved surfaces faced upwardly.

The respective pontoons are connected at 32 to longitudinally extending hinge bars 34 which pass through hinge brackets 36 lying transversely of and affixed to the respective floats. Abutting the brackets 36 are sleeves 38 provided upon the ends of transversely extending front and rear support frames 40, 42, respectively, each of which is of truss-like formation as best shown in Fig. 4.

The frames 40, 42 respectively include upwardly arched or bowed upper crossbars 44, 46, respectively, fixedly connected at their ends to horizontal lower crossbars 48, 50, respectively.

A platform generally designated at 52 includes a slatted deck 54, depending longitudinal reinforcing members 56 (Fig. 4), and spacer portions 58, 60 at the front and rear ends respectively, of the platform assembly. A gasoline tank 62 is secured to the underside of the deck adjacent the forward end thereof by U clamps 64.

Reinforcing the platform assembly, which is supported at its ends by and between the lower and upper crossbars of the respective frames 40, 42, are side braces 66 fixedly connected between the midlength portion of the deck and the opposite ends of elongated hinge sleeves 68 that receive the rods or bars 34, and that extend between the sleeves 38 of the respective frames 40, 42.

Extension sleeves 70 extend rearwardly between frame 42 and the rear ends of the floats, with the floats being hinged at their rear ends by brackets 72 upon said extension sleeves 70. Fixedly secured to the rear end portions of the sleeves 70 are rearwardly declining support bars 74 overlying and fixedly secured to the opposite side edge portions of a transversely disposed starting and landing board 76.

Connected at their rear ends as at 78 to the board 76 and projecting forwardly from the board are upwardly arched reel support frame members 80, the front ends of which are connected to a motor support bar 82 extending transversely of the device and secured fixedly to the platform assembly.

An outboard motor, not shown in Figs. 1 and 2, is adapted to be clamped to the bar 82 in position extending downwardly into the water immediately in front of a reel generally designated 86, having transversely spaced circular plates or heads 88 fixedly connected by a core 90, and having on their outer surfaces radial blades 92. A cable 94 is wound about the core and extends rearwardly for grasping by a water skier, not shown.

The reel turns on a shaft 96, the ends of which are journaled in the rear ends of the legs of a U-shaped yoke 98 extending forwardly from the shaft. A support yoke 100, also of U shape, is pivoted at its rear end upon the frame member 80 and at its forward end has sleeves receiving the shaft 96. The rear ends of the legs of yoke 98 are pivotable with shaft 96 with respect to the legs of yoke support 100.

The reel 86 is assumed held in the elevated position shown by full lines in Figs. 1 and 2 by the operator of the craft who stands on platform 52 and pulls the bight end of yoke 98 forwardly as indicated by arrow A so that the legs of the yoke assume the almost horizontal position shown in Fig. 1. Thus, the shaft 96 and reel 86 are raised to the upper extreme position shown, as the bight end of yoke 100 pivots on rods 80. To lower the reel the operator of the craft permits the reel and its shaft support to descend of their own weight while yoke 98 is moved rearwardly and the ends of its legs are moved downwardly, or the operator may push rearwardly on the bight of yoke 98 while he raises it so that the legs of the yoke tilt angularly with respect to the legs of yoke support 100 whose bight end pivots on rods 80. Thus the reel 86 is lowered to its extreme downward position as shown by dotted lines in Fig. 1.

In use, initially the device will lie in the water as in Fig. 1 in a perfectly horizontal position. However, under full load with the skier on the board and the motor in operation, the device settles at its rear end into the water to a slight extent, thus to plane upon the water when driven forwardly at comparatively high speed. In these circumstances, the water line will be as designated at W in Fig. 1.

When the reel is lowered into the water and revolving due to movement of the craft through the water, it brings the skier onto the board. In this connection, the skier is supported on individual foot support platforms generally designated 102 in Fig. 4. Each of these includes a frame extending laterally inwardly from the associated float and designated at 104, said frame carrying a foot support plate 106 which as shown in Fig. 2 may be provided with a stirrup or retaining strap 108.

Referring to Fig. 3, designated at 110 are brake shoes disposed for engaging the circular plates 88 and carried by a brake shoe support bar 112 connected fixedly between the upwardly bowed support rods 80. The shoes are disposed in position to engage the plates 88 in the raised position of the reel, as shown in Fig. 3 and in full lines in Fig. 1.

On lowering of the revolving reel into the water, a water skier, towed by cable 94, will be driven up to the apparatus. This is so because when the reel is lowered into the water to the extent shown by dotted lines in Fig. 1, that is, with the reel axis still disposed above water level, the water will rotate the reel counterclockwise in Fig. 1 due to the forward motion of the craft occurring by reason of the continued operation of the outboard motor.

Since the reel is rotating counterclockwise it will wind the cable 94, drawing up to the rear of the craft a water skier riding upon conventional water skis, not shown. The landing and starting board or plate 76, as shown in Fig. 1, is inclined at such an angle that the skis will be at an angle corresponding to that of the board 76. Therefore, the skier will travel up to and move smoothly onto the board 76, since his skis will be tilted upwardly at their forward ends correspondingly to the inclination of the board.

When the skier has landed on the device, he may be then returned to shore.

To launch a skier from the craft, the operator of the craft initially has the wheel in its upper, full line position of Fig. 1, in which position it is held against rotation by the brakes. This is done by shifting downwardly the bight or handle end of the yoke 98. The operator of the reel, of course, stands upon the foot plates 106, facing to the rear. The skier is supported upon the board 76, holding in his hands the usual crossbar or handle, not shown, attached to the free end of the cable 94. The cable is fully wound upon the reel at this time.

The reel is then lowered toward the water to the dotted line position shown, but does not enter the water except perhaps to a very small extent. Therefore, the backward pull of the skier is greater than the tendency of the reel to revolve counterclockwise, and the skier begins to move rearwardly from the craft. The skier leaves the starting board 76, in this connection, by pressing the rear of the skis downwardly so as to rear back upon the board 76 and slide therefrom fully into the water. When the skier has reached the correct skiing distance rearwardly from the craft, the reel operator on the craft swings the reel upwardly into engagement with the brakes. All this is done, of course, in a manner to permit the skier to move slowly, smoothly away from the water craft until he has reached the proper distance from the same. The movement of the skier rearwardly from the craft, that is, during the unwinding of the cable 94 from the reel, can be controlled as to speed and smoothness by selective immersion of the reel in the water to a desired extent, that is, the more the reel is moved downwardly into the water, the slower will be the movement of the skier backwardly from the craft, due to the fact that the cable is unwound only at a very slow rate in these circumstances.

The craft will, of course, be manned not only by the rearwardly facing operator of the reel 86 but also by a driver, who will have a suitable control or steering mechanism for the outboard motor, and who would be seated upon the front part of the platform, facing forwardly. A single operator, of course, could be provided for the boat or water craft.

With the skier now being drawn behind the water craft, the reel may be locked in its upper position, by suitable locking mechanism, not shown. The towing apparatus, in these circumstances, can be turned by swinging of the floats to selected positions. For example, as shown in Fig. 4, a left turn can be made by placing the right foot down upon the plate 106, supporting the same while the left foot is pulled upwardly. The floats will now be in the Fig. 4 position providing for a left turn. Right turns are, of course, made by an opposite action.

In Figs. 5 and 6 there is shown a modified construction which is like that of the first form in all respects except for the particular mounting of the starting and landing board, the reel support yoke, and the reel itself. In this form, a U-shaped yoke 114 has its legs hingedly connected at 116, at their rear ends, to the forward edge of the board 76. Forwardly a short distance from the rear ends of the legs, a shaft 118 extends between and is journalled at its ends in the legs of the yoke. The yoke is bodily swingable between the full and dotted line positions of Fig. 6, for lowering and raising the reel. In this arrangement, the braking action is produced by the forward edge of the board, as will be readily noted by a study of the dotted line position of the reel in respect to the forward edge of the board 76. Thus, the rearward pull exerted on the cable 94 by the skier tends to swing the yoke 114 upwardly, and when the cable is fully unwound, the reel is automatically held in full frictional engagement with the board 76 by the rearward pull exerted upon the cable by the skier himself. The operator of the craft thus need not pay strict attention to the yoke at this time. Of course, when the skier is to be pulled onto the board 76, the yoke is merely lowered to cause rotation of the reel by the water in a direction to wind the cable.

Figure 8:
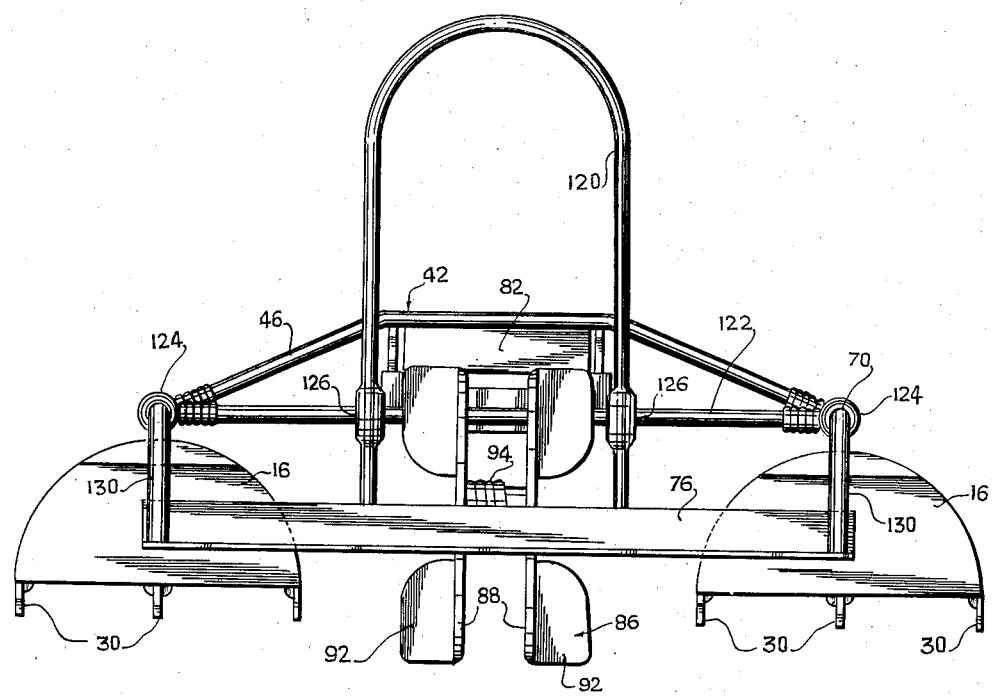
Fig. 8 is a rear elevational view of the device shown in Figs. 7 and 7A.
Figure 9:
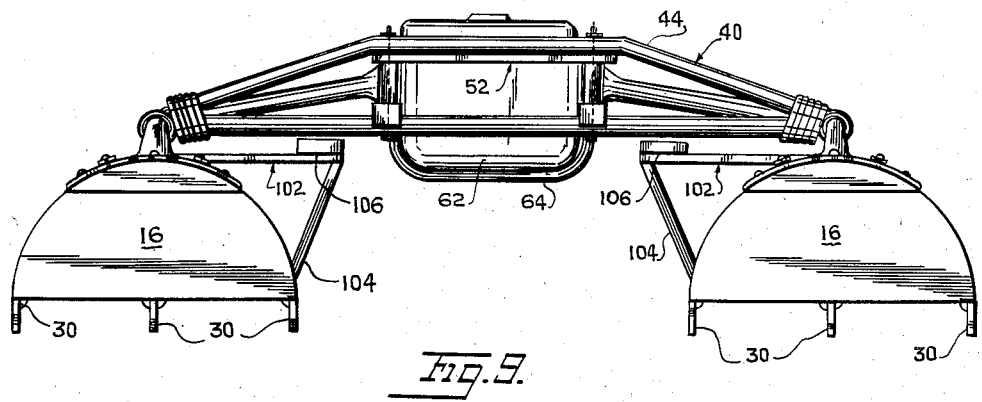
Fig. 9 is a front elevational view of the device shown in Figs. 7 and 7A.

In Figs. 7-9, again the construction is identical in all respects to that previously described, with the exception of the mounting of the landing board and the formation and the mounting of the yoke.

In this form of the invention, the yoke 120 is movable between the full and dotted line positions shown in Fig. 7A, and is of U shape, with its respective legs being gently, compoundly curved as shown. In this form, the legs of the yoke are pivoted on a horizontal, transverse axis defined by a bar 122 (see Fig. 8) having at its ends sleeves 124 receiving the extension sleeves 70. The yoke legs have sleeves 126 intermediate their ends receiving and rotatable upon the bar 122, and at their rear ends the yoke legs carry a horizontal, transverse shaft 128 on which reel 86 is freely rotatable.

In this form of the invention, no braking means has been illustrated, but it will be understood that a suitable braking action can be had if desirable.

Board 76 in this form is secured to loop-like extensions 130 of sleeves 70.

The outboard motor has been designated M and is mounted similarly to the mounting of the motor in the first form of the invention. The operational characteristics of the device, of course, are the same as those previously described with reference to the first and second forms.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel including blades arranged for effecting rotation of the reel by the water during the forward movement of the apparatus therein, a towing cable wound upon the reel, said reel when rotated by the water turning in a cable-winding direction, and a combination landing and launching platform on said structure disposed rearwardly from said reel.

2. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel being movable out of the water to another extreme position when said means is adjusted in an upward direction, said reel including blades arranged for effecting rotation of the reel by the water during the forward movement of the apparatus therein, a towing cable wound upon the reel, said reel when rotated by the water turning in a cable-winding direction, and a combination landing and launching platform on said structure disposed rearwardly from said reel, said apparatus further including a brake means carried by the structure and arranged to prevent rotation of the reel in the other extreme position of the reel.

3. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel including blades arranged for effecting rotation of the reel by the water during the forward movement of the apparatus therein, a towing cable wound upon the reel, said reel when rotated by the water turning in a cable-winding direction, and a combination landing and launching platform on said structure disposed rearwardly from said reel, said platform being pitched at an incline, substantially at water level, for movement of a water skier onto and off the platform with his skis correspondingly inclined.

4. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel including blades arranged for effecting rotation of the reel by the water during the forward movement of the apparatus therein, a towing cable wound upon the reel, said reel when rotated by the water turning in a cable-winding direction, and a combination landing and launching platform on said structure disposed rearwardly from said reel, said platform being pitched at an incline, substantially at water level, for movement of a water skier onto and off the platform with his skis correspondingly inclined, the platform being rigid with said structure.

5. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel being movable out of the water to another extreme position when said means is adjusted in an upward direction, said reel including blades arranged for effecting rotation of the reel by the water during the forward movement of the apparatus therein, a towing cable wound upon the reel, said reel when rotated by the water turning in a cable-winding direction, and a combination landing and launching platform on said structure disposed rearwardly from said reel, said apparatus further including a brake means carried by the structure and arranged to prevent rotation of the reel in the other extreme position of the reel, said brake means comprising brake shoes disposed for engaging the periphery of the reel at said other extreme position of the reel, with the reel disposed wholly out of the water, said reel being movable to an intermediate position in which it is still out of the water and is free to rotate in a cable-unwinding direction responsive to pull exerted on the cable by a skier towed by the apparatus.

6. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel being movable out of the water to another extreme position when said means is adjusted in an upward direction, said reel including blades arranged for effecting rotation of the reel by the water during the forward movement of the apparatus therein, a towing cable wound upon the reel, said reel when rotated by the water turning in a cable-winding direction, and a combination landing and launching platform on said structure disposed rearwardly from said reel, said apparatus further including a brake means carried by the structure and arranged to prevent rotation of the reel in the other extreme position of the reel, said brake means comprising brake shoes disposed for engaging the periphery of the reel at said other extreme position of the reel, with the reel disposed wholly out of the water, said reel being movable to an intermediate position in which it is still out of the water and is free to rotate in a cable-unwinding direction responsive to pull exerted on the cable by a skier towed by the apparatus, the reel support means being swingably mounted upon said structure.

7. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel being movable out of the water to another extreme position when said means is adjusted in an upward direction, said reel including blades arranged for effecting rotation of the reel by the water during the forward movement of the apparatus therein, a towing cable wound upon the reel, said reel when rotated by the water turning in a cable-widing direction, and a combination landing and launching platform on said structure disposed rearwardly from said reel, said apparatus further including a brake means carried by the structure and arranged to prevent rotation of the reel in the other extreme position of the reel, said brake means comprising brake shoes disposed for engaging the periphery of the reel at said other extreme position of the reel, with the reel disposed wholly out of the water, said reel being movable to an intermediate position in which it is still out of the water and is free to rotate in a cable-unwinding direction responsive to pull exerted on the cable by a skier towed by the apparatus, the reel support means being swingably mounted upon said structure, and including a yoke in embracing relation to said reel.

8. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel including blades arranged for effecting rotation of the reel by the water during the forward movement of the apparatus therein, a towing cable wound upon the reel, said reel when rotated by the water turning in a cable-winding direction, and a combination landing and launching platform on said structure disposed rearwardly from said reel, said structure including transversely spaced floats extending in a fore-and-aft direction.

9. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel being movable out of the water to another extreme position when said means is adjusted in an upward direction, said reel including blades arranged for effecting rotation of the reel by the water during the forward movement of the apparatus therein, a towing cable wound upon the reel, said reel when rotated by the water turning in a cable-winding direction, and a combination landing and launching platform on said structure disposed rearwardly from said reel, said apparatus further including a brake means carried by the structure and arranged to prevent rotation of the reel in the other extreme position of the reel, said brake means comprising brake shoes disposed for engaging the periphery of the reel at said other extreme position of the reel, with the reel disposed wholly out of the water, said reel being movable to an intermediate position in which it is still out of the water and is free to rotate in a cable-unwinding direction responsive to pull exerted on the cable by a skier towed by the apparatus, the reel support means being swingably mounted upon said structure, and including a yoke in embracing relation to said reel, said yoke projecting forwardly from the reel to provide a handle for effecting swinging movement of the yoke.

10. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel including blades arranged for effecting rotation of the reel by the water during the forward movement of the apparatus therein, a towing cable wound upon the reel, said reel when rotated by the water turning in a cable-winding direction, and a combination landing and launching platform on said structure disposed rearwardly from said reel, said platform being pitched at an incline, substantially at water level, for movement of a water skier onto and off the platform with his skis correspondingly inclined, said platform extending transversely of the apparatus.

11. A towing apparatus for water skiers comprising a buoyant structure, a reel support means mounted for up-and-down adjustment on said structure, a reel rotatably carried by said means and movable at least partially into the water to one extreme position when said means is adjusted in a downward direction, said reel being movable out of the water to another extreme position when said means is adjusted in an upward direction, said reel including blades arranged for effecting rotation of the reel by the water during the forward movement of the apparatus therein, a towing cable wound upon the reel, said reel when rotated by the water turning in a cable-winding direction, and a combination landing and launching platform on said structure disposed rearwardly from said reel, said apparatus further including a brake means carried by the structure and arranged to prevent rotation of the reel in the other extreme position of the reel, said brake means comprising brake shoes disposed for engaging the periphery of the reel at said other extreme position of the reel, with the reel disposed wholly out of the water, said reel being movable to an intermediate position in which it is still out of the water and is free to rotate in a cable-unwinding direction responsive to pull exerted on the cable by a skier towed by the apparatus, the reel support means being swingably mounted upon said structure, and including a yoke in embracing relation to said reel, said yoke projecting forwardly from the reel to provide a handle for effecting swinging movement of the yoke, the pivot axis of said yoke extending transversely of the apparatus in parallel relation to said platform.

References Cited in the file of this patent
UNITED STATES PATENTS

| | | |
|---|---|---|
| 121,249 | Lake | Nov. 28, 1871 |
| 401,446 | Lotze | Apr. 16, 1889 |
| 2,821,726 | Correll | Feb. 4, 1958 |